United States Patent
Stankovic

[11] Patent Number: 6,035,256
[45] Date of Patent: Mar. 7, 2000

[54] METHOD FOR EXTRAPOLATING TRAVELTIMES ACROSS SHADOW ZONES

[75] Inventor: Goran Milan Stankovic, Houston, Tex.

[73] Assignee: Western Atlas International, Inc., Houston, Tex.

[21] Appl. No.: 08/918,636

[22] Filed: Aug. 22, 1997

[51] Int. Cl.[7] .................................................. G06F 19/00
[52] U.S. Cl. ................................................. 702/14; 702/16
[58] Field of Search ...................... 367/51, 99, 21, 367/25, 72, 53, 33; 702/14, 186, 127, 18, 16

[56] References Cited

U.S. PATENT DOCUMENTS

| | | | |
|---|---|---|---|
| 5,067,113 | 11/1991 | Hanson et al. | 367/50 |
| 5,089,994 | 2/1992 | Harlan et al. | 367/73 |
| 5,170,377 | 12/1992 | Manzur | 367/73 |
| 5,229,938 | 7/1993 | Wang et al. | 364/421 |
| 5,235,555 | 8/1993 | Albertin | 367/53 |
| 5,265,068 | 11/1993 | Wang et al. | 367/38 |
| 5,394,325 | 2/1995 | Schneider, Jr. | 364/421 |
| 5,530,679 | 6/1996 | Albertin | 367/68 |
| 5,586,825 | 12/1996 | Carrazzone et al. | 367/25 |
| 5,596,547 | 1/1997 | Bancroft et al. | 367/51 |
| 5,724,310 | 3/1998 | Stankovic, et al. | 367/51 |

OTHER PUBLICATIONS

Subroutine RAYT2D, Seismic Unix Software, updated Nov. 1994, Colorado School of Mines website /www.cwp.mines.edu/cwpcodes/.

Seismological Society of America, v, 78, n. 6, pp 2662–2076, Dec., 1985.

*Primary Examiner*—Patrick Assouad
*Assistant Examiner*—Victor J. Taylor
*Attorney, Agent, or Firm*—Madan, Mossman & Sriram, P.C.

[57] ABSTRACT

A hybrid wavefront generator for bridging shadow zones for use with Kirchhoff migration. A graticule of travel-time grid points is mapped over a velocity model of an area of interest. The data assigned to each travel-time grid point are initialized using a unique code. By use of a conventional travel-time generator, wavefront travel times are calculated for the respective travel-time grid points. The calculated travel time, if valid, replaces the unique code previously resident therein. Wavefront travel times are re-evaluated for each travel-time grid point using a finite-difference travel-time solver. The quantity resident in each travel-time grid point is examined. If the quantity found is the unique initialization code, the unique initialization code is replaced by the re-evaluated finite-difference travel time. If a valid wavefront travel time is found, no further action takes place.

6 Claims, 9 Drawing Sheets

METHOD FOR EXTRAPOLATING TRAVELTIMES ACROSS SHADOW ZONES

BACKGROUND OF THE INVENTION

1. Field of the Invention

A method is disclosed for extrapolating the seismic wavefront traveltimes across ray-path shadow zones due to severe velocity discontinuities found in association with complex geology such as salt domes and the like.

2. Discussion od Relevant Art

In one form of geophysical exploration for natural resources, a seismic wavefield is radiated from a source point at or near the surface of the earth. Initially propagating as a spherically expanding wavefront, the radiation insonifies the various earth layers which usually offer an acoustic impedance mismatch at the layer boundaries due to variations in rock density and acoustic velocity. The wavefield is reflected from the respective layer boundaries to return to the surface where the mechanical earth motions due to the reflected wavefield are converted to electrical signals by transducers. The signals which comprise the seismic data, are stored on archival storage media for future processing.

It is the object of seismic studies to produce a model of a volume of subsurface earth formations in a region of geological and/or economic interest. For an isotropic horizontal stratum with constant velocity, the elapsed time between wavefield emission and wavefield reception at a receiver near the source, multiplied by half the average velocity, is the depth of the incident point of the reflected wavefield on the stratum that lies directly beneath the midpoint between the source and receiver.

If a reflector is tilted or the velocity is spatially variable, that simple relationship no longer holds; the incident point is shifted laterally up-dip relative to the source/receiver midpoint. Proper mapping of dipping or tilted reflectors, requires migration of the wavefields originating from those dipping strata. One well-known migration technique is Kirchhoff depth migration.

The computation of wavefield travel times at selected output points is a key element in successful Kirchhoff depth migration of seismic data. For complex geology, wavefield travel times to the output points are preferably generated by ray tracing from the source. Ray-traced travel-time generation methods are preferred because they can produce travel times for all wavefront arrivals at an output point.

By way of review, a velocity model of a region of interest is provided in FIG. 1. A first ray is shot at a first selected angle from a source into a velocity model. The ray is traced through all of the intervening earth layers via pathways determined by the well-known Snell's-law refraction effects at the velocity discontinuities that characterize the layer boundaries. Given the velocity sequence which is known from the velocity model, the travel time of the wavefront of a radiated wavefield may be computed at any point along the ray path. A second and additional rays, directed at second and additional selected angles relative to the surface are shot from the source. A wavefront envelope at any given instant, for use in migration, can be reconstructed by joining the loci corresponding to equal travel times as measured along the respective ray segments. By definition, the wavefront is perpendicular to the ray trajectory.

One method is taught by U.S. Pat. No. 5,229,938, issued Jul. 20, 1993 to Shein-Shen Wang et al. Here is taught a method for obtaining two-way travel times for source and receiver pairs that includes the steps of determining a set of one way travel times for each source to a plurality of image points and a set of one way travel times for each receiver to a plurality of image points. Ray sets are generated for both sources and receivers. Travel times from a source position to image points are computed by two-point interpolation using the ray sets. Two-way travel time is computed by summing two sets, one set each for the source and receiver positions. A two-way travel time set is obtained for a particular source and receiver combination for all imaging points.

In general, for prestack depth imaging, Kirchhoff migration is preferred. Kirchhoff migration requires use wavefront travel time generators of any one of several well-known types that are based on ray tracing as above outlined. Ray-tracing methods are useful in complex geological structures but they produce unwanted shadow zones in the travel-time data in the presence of complex stratigraphic velocity domains. It is assumed, of course that the shadow zones are not the result of penury in ray-path shooting. Ray-traced traveltimes permit use of both first-arrival data as well as maximum-energy arrivals, which latter data produce superior imagery. However those methods are very slow and greedy of computer processing time.

Eikonal (finite difference) traveltime generators are very fast and do not produce shadow zones. Finite difference traveltime generators will always pick the first arrival travel times whereas with ray-traced travel-time generators, the desired portion of the wave front must specifically be selected.

A well-known finite-difference traveltime generator is disclosed in a paper published in the *Bulletin of the Seismological Society of America*, v. 78, n. 6, December 1988, pp 2062–2076, by John Vidale. Here the travel times of the first arriving seismic waves through any velocity structure can be rapidly computed on a multi-dimensional grid by finite-difference point-to-point extrapolation. Wavefronts are tracked instead of rays. Refracted waves are properly treated and shadow zones are filled the appropriate wavefront segments. This scheme is very fast and is useful in tomographic inversion and Kirchhoff migration in geologic section characterized by smooth lateral velocity gradients.

In accordance with this invention, a hybrid traveltime generator is proposed for use in the presence of a complex velocity model wherein wavefronts initially will be generated using any well-known wavefront travel-time generator. Upon encountering a wavefront shadow zone the Vidale finite-difference wavefront generator will be used for extrapolating the wavefronts across missing wavefronts in wavefront shadow-zones.

SUMMARY OF THE INVENTION

This is a computer-aided method for extrapolating reflection travel-time estimates into and across travel-time shadow zones caused by ray-path distortion resulting from wavefield propagation across hard velocity discontinuities between velocity-domain boundaries associated with complex geology of a section of the earth. A graticule of traveltime grid points are mapped over the section, each for receiving a quantity representative of the arrival time of a wavefront segment thereat. The contents of each travel time grid point are initialized with a preselected unique code. A plurality of ray tubes are shot into the complex geologic model by known methods from a preselected source point. For every travel-time grid point that is traversed by each ray tube, the preselected code previously assigned to that travel-time grid point is replaced with a numerical estimate of the travel time of a wavefront arriving at that travel-time grid point from the source point. When more than one travel time is assigned to any one of the travel-time grid points, the wavefront travel-time estimate that is accepted as valid, is a travel-time that satisfies a preselected criterion.

The wavefront travel-time estimates at each said travel-time grid point relative to the preselected source point are then re-evaluated using a finite difference algorithm. Each travel-time grid point is scanned. If a copy of the preselected unique code remains assigned to a travel-time grid point under consideration, the re-evaluated wavefront travel-time estimate is substituted for the unique code resident therein, else the quantity previously accepted as valid is left intact.

In an aspect of this invention, the preselected criterion is the arrival time of the maximum energy of the wavefront.

In another aspect of this invention,, the preselected criterion is the wavefront first-arrival time.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
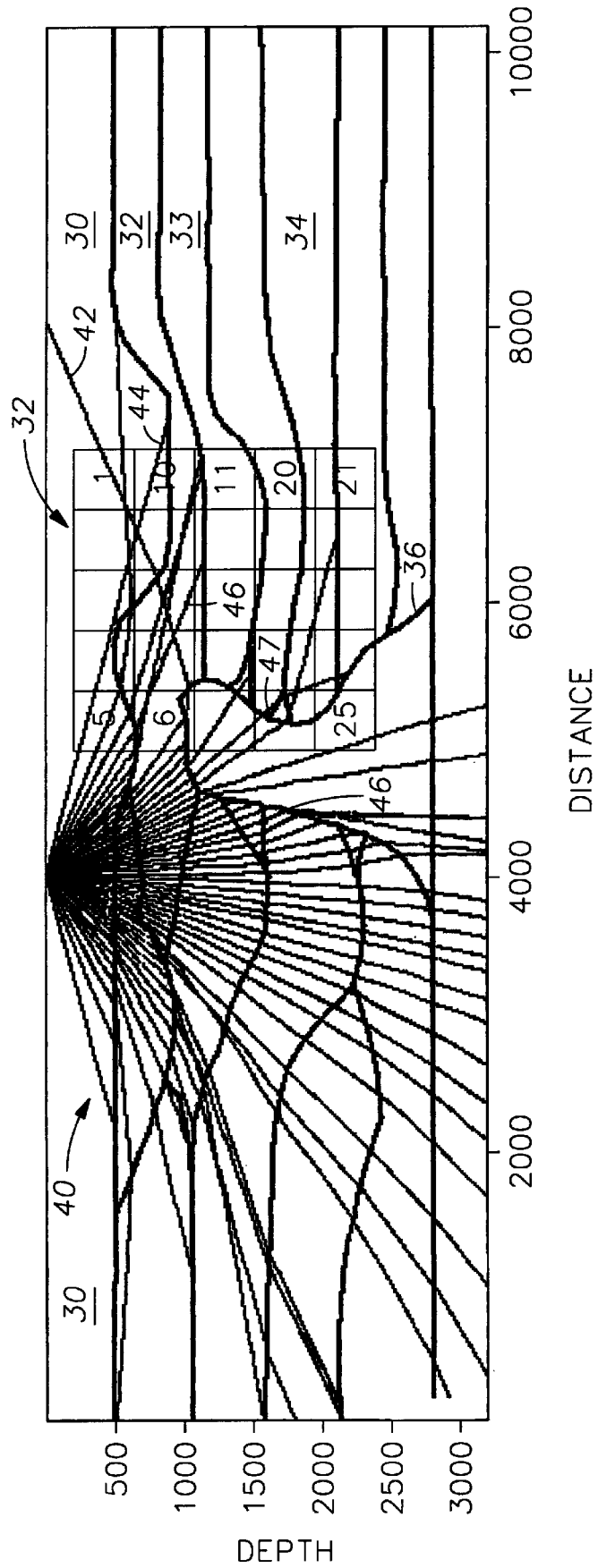
FIG. 1 is a model of the velocity domains associated with a two-dimensional cross sectional model of the earth.

FIG. 1 is a velocity model of a cross section of the earth. This disclosure will, for simplicity, be described in terms of the two dimensions of horizontal distance laterally, and depth vertically, both to the same scale. Extension of the principles herein disclosed, from two to three dimensions is a trivial exercise for those skilled in the art.

In FIG. 1, the heavy lines define individual velocity domains which often coincide with geological horizons. The region 30, above the uppermost horizon, is characterized by a wavefield propagation velocity (hereafter, simply "velocity") of about 2500 meters per second (m/s). Earth layers below, such as 32 and 34 will have velocities ranging from about 2750–4000 m/s. Salt intrusions such as 36, may have a velocity on the order of 4500 m/s. As shown in the drawing, the boundaries between velocity domains are convoluted, a condition that distorts interpretation of the seismic data that were gathered to reveal the attitude of geologic markers of economic interest such as strata abutting the flanks of salt domes.

The velocity model is initialized by mapping a pattern of travel-time grid points over the entire velocity model. By way of an illustrative example but not by way of limitation, a small exemplary 5×5 graticule, generally shown as 32, is mapped over the velocity model. The travel-time grid points are numbered 1–25 in the numerical order indicated. A travel-time grid point is a nebulous region that may encompass an area on the order of survey-station spacing or about 25 meters.

Having initialized a graticule over the velocity model, a unique preselected code is assigned to each travel-time grid point. The unique initialization code may conveniently be some number such as the largest floating-point number capable of expression by a data-processing unit which is presumed to be a digital device.

Figure 2:
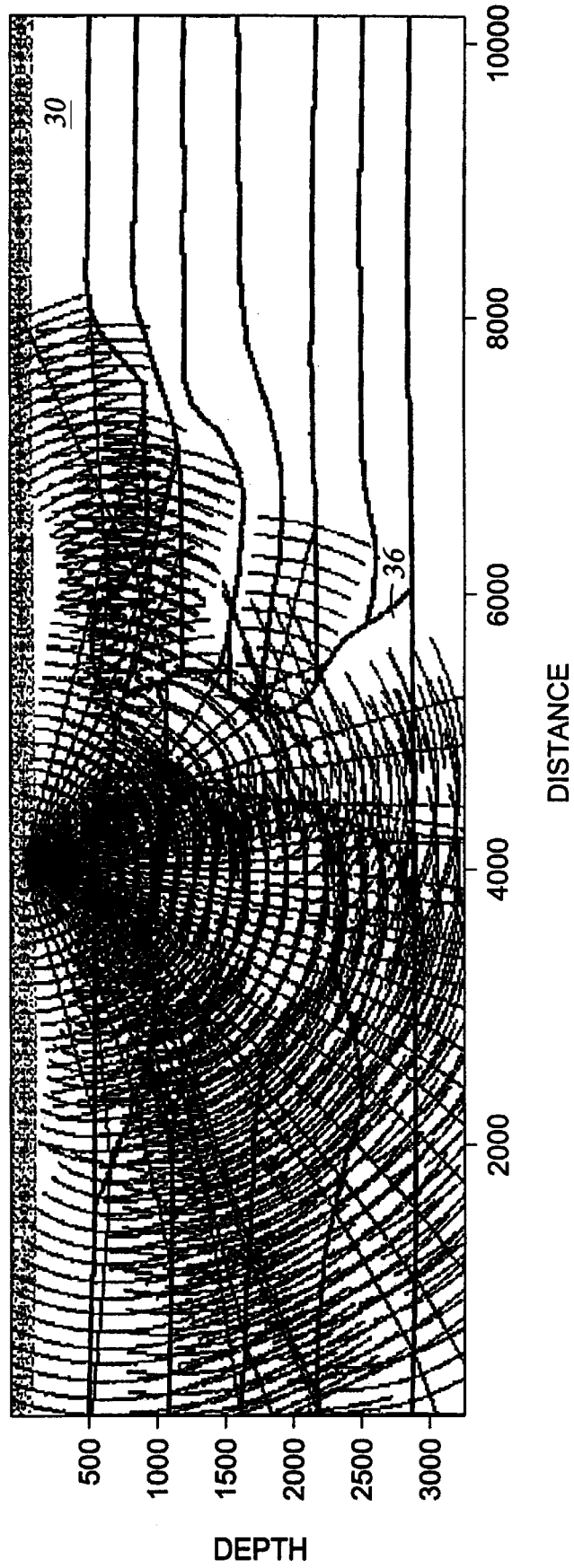
FIG. 2 are wavefront segments as calculated using a paraxial travel-time generator.

In FIGS. 1 and 2 a source point is assumed to be located at a distance of 4000 meters from an arbitrary starting point. A fan of 51 ray tubes, generally shown as 40 is shot into the velocity model using any well-known travel-time generator. More ray tubes may be used, depending upon the desired resolution. The term "ray tube" is used to indicate that a ray-path trajectory assumes quasi-volumetric characteristics averaged over the area of a travel-time grid point. The ray tubes radiating from the source point, are deviated at each velocity-domain boundary as required by Snell's-law refraction or reflection.

In FIG. 1, the trajectories of a number of ray tubes intersect such as ray tubes 42 and 44 at the border between travel-time grid points 2 and 9, at travel-time grid point 8, and ray tubes 42 and 46 at travel-time grid point 7. Ray tube 46 is totally refracted into the interface between formations 32 and 33 at travel-time grid point 12. Ray tube 47 is totally refracted into the interface above layer 34 at travel-time grid point 17. The pattern of ray tubes propagating through salt mass 36 is highly irregular.

In FIG. 2, wave-front segments have been erected along the respective ray tube trajectories at 0.040-s time intervals. Since the display is a depth display, the distance between wavefronts is proportional to the velocity of the region within which the wavefront is propagating. Hence the wavefronts are further apart in the salt mass region 36, where the velocity is of the order of 4500 m/s, than in the region 30, where the velocity is about 2500 m/s.

Figure 3:
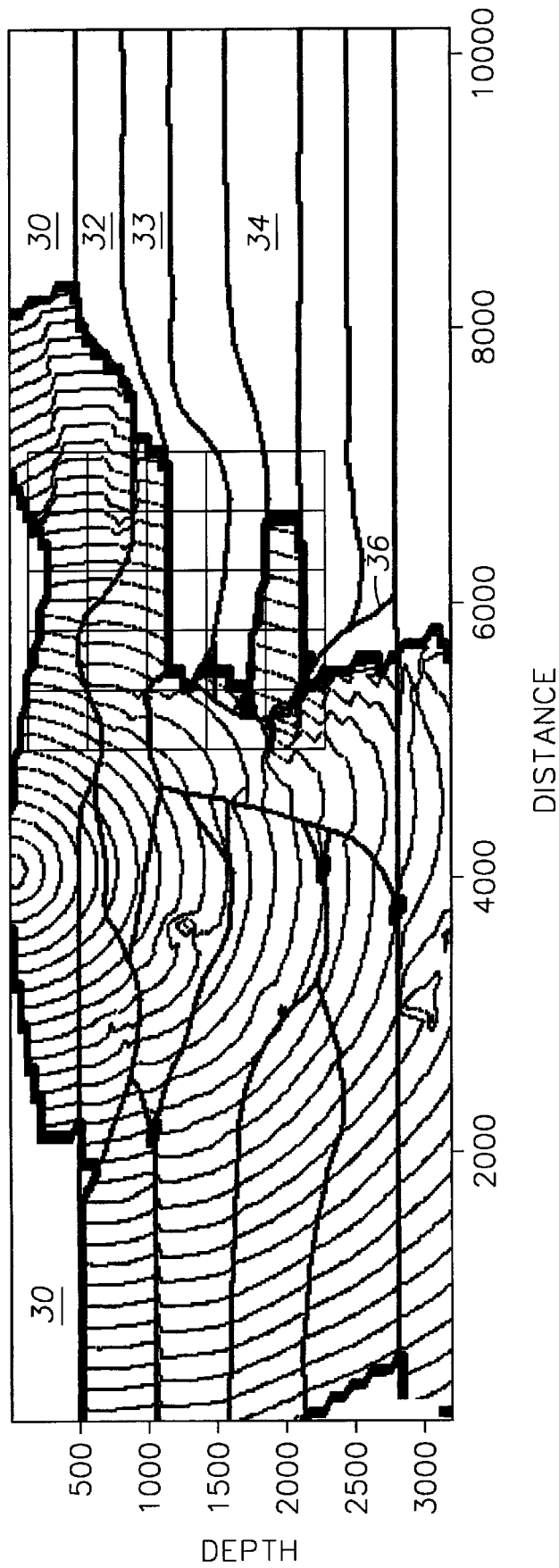
FIG. 3 is a display of interpolated wavefront isochron contours.

The raw presentation in FIG. 2 is complex. A more easily interpretable display is a contoured wavefront isochron map such as shown in FIG. 3. FIGS. 2 and 3 are displays of the results of a conventional wavefront travel-time generator. As before stated, although the spacings between contours is constant in time, the respective spatial widths between contours will vary in proportion to the magnitude of local velocity fields. Contour discontinuities usually indicate velocity-domain boundaries although some of the discontinuities may be processing artifacts caused by sampling limitations or truncation errors.

A shadow zone is present in layer 30 between the offsets from 0 to about 3000 meters and between 8000 and 10000 meters to the east. Most of the east third of the model is devoid of wavefront data. The east flank of salt intrusion 36 is ill-defined. The top of the salt dome 36 has so severely bent ray tube 42 out of shape that it returns to the surface, crossing a shallower ray tube 44 as previously pointed out.

For every travel-time grid point traversed by a ray tube, a wavefront travel time is computed. The computed travel time is inserted at each of the traversed travel-time grid points in sequence, replacing the unique code that was inserted in that travel-time grid point during initialization. Accordingly, the presence of the unique code, that is, the initialization residue, at a particular travel-time grid point flags that grid point as living in a shadow zone.

In the event that more than one wavefront traveltime is assigned to a given travel-time grid point, as might occur where the raypaths cross as at travel-time grid points 8 or 9, the selection of a valid wavefront travel time is governed by some preselected wavefront criterion such as the arrival time of maximum energy or the time of the very first arrival.

One cannot know a priori where shadow zones will occur in a given model. One way to locate such zones would be to plot the ray tube trajectories and to generate and display the wavefront contours for study as in FIGS. 1–3. But that process would needlessly interrupt the smooth flow of data-processing steps.

As before stated, the identity of any travel-time grid point that occupies a shadow zone is betrayed by the presence of the unique initialization code remaining at a travel-time grid point after the original application of the travel-time generator to the model. Upon completion of the conventional wavefront travel-time processing as explained above, it is proposed to scan all of the travel-time grid points for initialization garbage. Wavefront travel times will then be re-evaluated and extrapolated to travel-time grid points empty of valid data using the fast Vidale finite-difference algorithm next to be explained.

Figure 4:
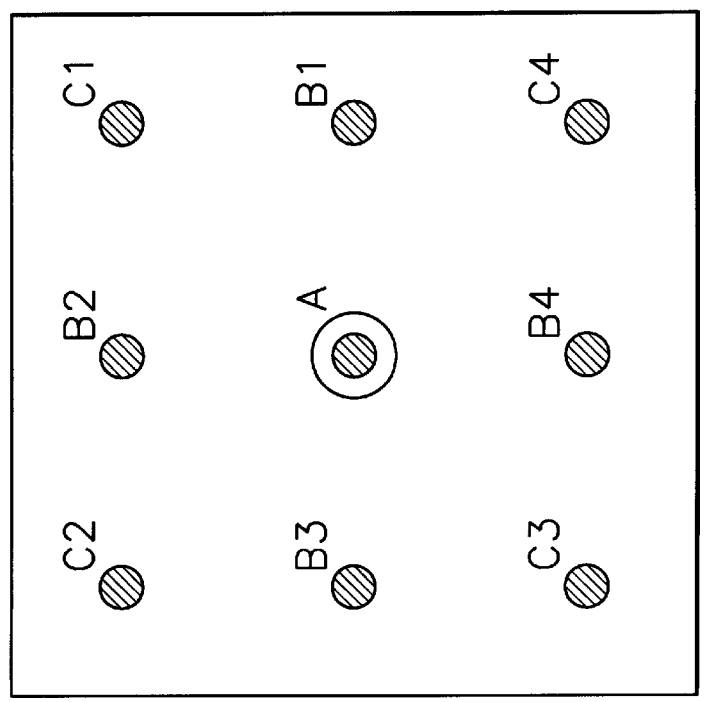

Please refer to FIG. 4 where there are shown nine travel-time grid points radiating from a central source point A which may be a virtual source point. The offset between point A and points $B_i$ is h. From the average slowness, $\frac{1}{2}(S_{B1}+S_A)$ between A and a point such as $B_1$, the wavefront travel time $t_1$ is:

$$t_1 = h \times \frac{1}{2}(S_{B1}+S_A), \quad (1)$$

and similarly for the remaining points, $B_i$, to provide times $t_i$, where the subscripted S are the values of the slowness at each of the respective grid points. Given that the travel time at A is known to be $t_0$, the travel time $t_3$ is extrapolated from virtual source A to each one of the four corners, $C_j$, using a formulation that assumes locally-plane waves:

$$t_3 = t_0 + (\{2hS\}^2 - \{t_2 - t_1\}^2)^{1/2}. \quad (2)$$

In the first ring as in FIG. 4, the minimal travel time along any of the four lateral vectors such as $C_{j1}$-$B_{i1}$-$C_{j4}$ is likely to be $B_{i1}$.

Formulation (2) can be derived from the eikonal equation $$\left(\frac{\partial t}{\partial x}\right)^2 + \left(\frac{\partial t}{\partial z}\right)^2 = s(x,z)^2.$$

For a more complete discussion, see the Vidale reference and also see R. Sheriff, Encyclopedic Dictionary of Exploration Geophysics at page 98.

In FIG. 4, it is assumed that wavefronts radiate outwardly in all directions. In the case of a surface source, such as postulated for FIG. 1, computations for the top row, $C_2$-$B_2$-$C_1$ would not take place. It should be further understood that point A may be a virtual source point located anywhere in the section under study such as at 46, FIG. 1 where a ray tube terminates against the flank of salt come 16. That is in accordance with Huygens's principal that every point on a wavefront may become a new source of radiation.

Figure 5:
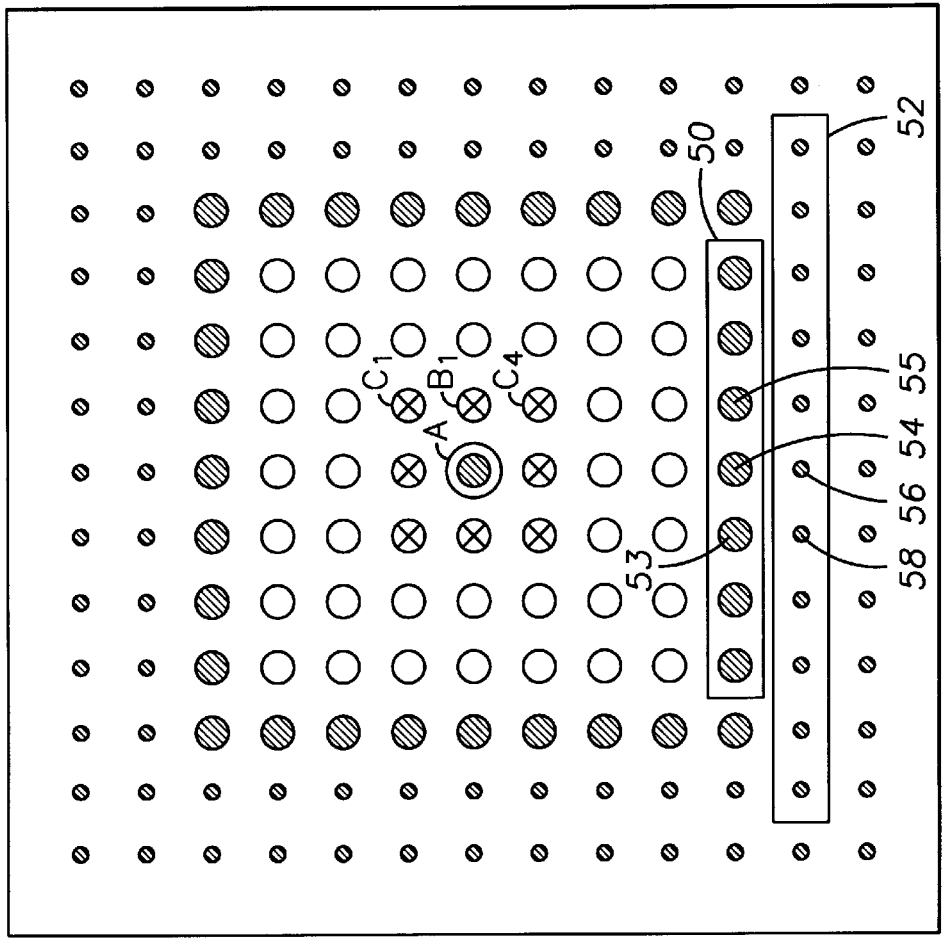
FIGS. 4 AND 5 demonstrate the principles of the Vidale wavefront extrapolation process.

Now refer to FIG. 5. The original travel times that were first calculated for the nine grid points are shown as crossed circles. The large blackened circles comprise the edges of a ring that has just been evaluated, one side of which is designated as vector 50. The open circles represent travel-time grid points that were previously quantified. The dots indicate the grid points next to be processed, of which vector 52 represents a side of an expanding ring of grid points.

Along a side under consideration, such as 50, identify the grid point to which is assigned a relative minimum travel time. Let it be assumed that grid point 54 is such a grid point. Travel time $t_3$ to grid point 56 is derived using formulation (3), a non-centered version of formulation (2):

$$t_3 = t_0 + (\{hS\}^2 - 0.25\{t_2 - t_1\}^2)^{1/2}, \quad (3)$$

$t_0$ being the travel time to grid point 54 (the grid point assumed to have the relative minimal travel time), $t_1$ being the travel time to grid point 53 and $t_2$ being the travel-time to grid point 55. The travel time to grid point 58 is provided by formulation (2) using inputs from grid points 54, 56 and 53. The process is repeated proceeding to the left from each point with relative minimum travel time, point-by-point with application of formulation (2) until the end of vector 52 or a relative maximum value is encountered. Upon completion of the left hand side of the vector, similar treatment is applied to the vector 52 to the right of relative minimum 50. The practice is required for stability.

The finite difference algorithm is very fast. Accordingly, the steps of scanning the model for shadow zones, re-evaluating the wavefront travel times and extrapolating wavefront travel times are combined into a single process: Following the calculation of wavefront travel times by use of any conventional traveltime generator, the wavefront travel times are re-evaluated for every travel-time grid point using the finite difference process above outlined. As each travel time is generated by the method of finite differences for a given travel-time grid point, the data assigned to that travel-time grid point are examined. If the travel-time grid point still contains the unique initialization code, that travel-time grid point resides in a shadow zone. The travel time provided by the finite difference traveltime generator is thereupon assigned to that travel-time grid point as the required valid wavefront travel time. If, however, the travel-time grid point already contains a valid travel time no entry is made.

Figure 6:
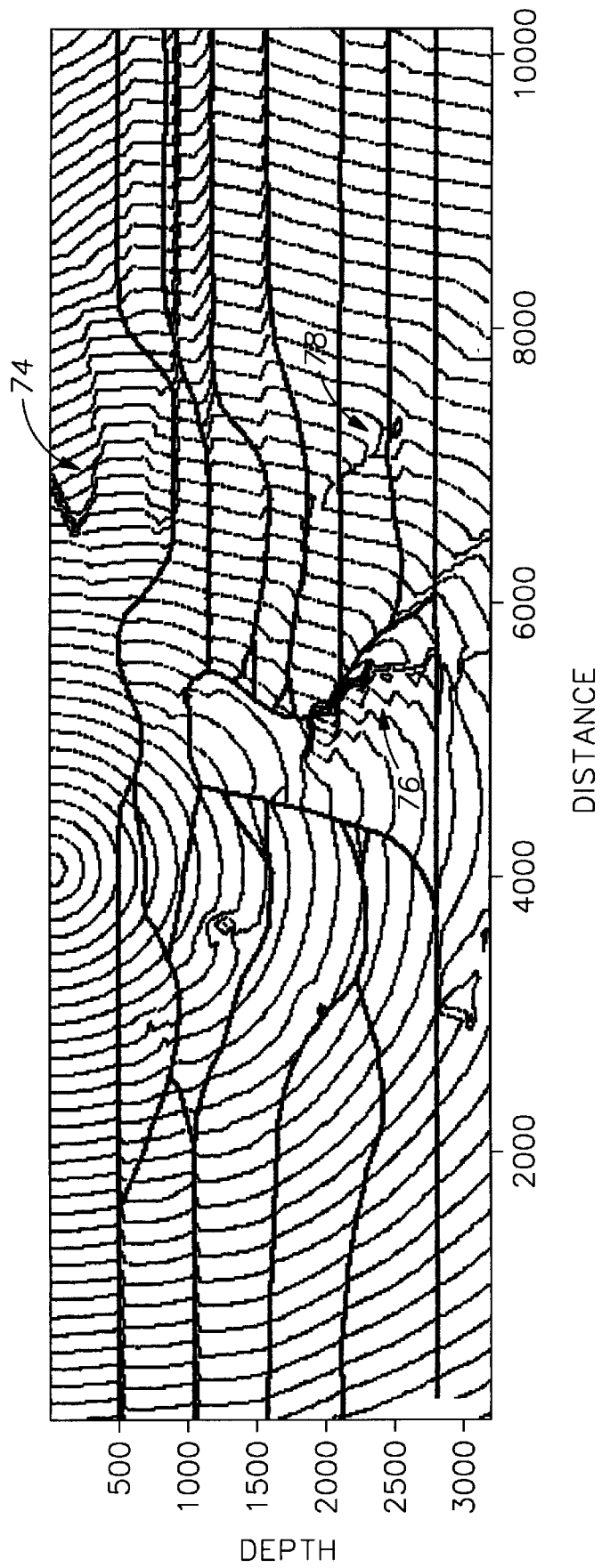
FIG. 6 shows the wavefront isochron contours after extrapolation of wavefronts into shadow zones.

FIG. 6 shows the wavefront travel-time contours generated by the hybrid seismic data-processing steps of modified finite difference travel time generation, followed by travel-time grid point-scanning for missing data and finally by extrapolation of wavefront travel times to data-empty travel-time grid points using a finite-difference travel time generator. In FIG. 6, the discontinuity at 74 are due to poor ray coverage in that area as indicated by the intersecting ray tubes 42 and 44. The confusion shown at 76 on the east side of salt intrusion 36 may be due to truncation artifacts. The cause of the discontinuity at 78 is unknown.

The various steps of the invention discussed above are summarize in FIGS. 7a–7d. Starting at 100, the travel time grid is mapped over the velocity model. A check is made at 101 to see if the maximum energy criterion has been selected. It so, the amplitude grid is mapped over the velocity model 103 and the amplitude grid points are initialized 105. If the answer at 101 is "No," then processing goes directly to 102 where traveltime grid points are initialized. The number of rays to shoot is set 106 and the ray parameter for the next ray is set 106. Using this ray parameter, a single ray is shot into the velocity model 107 and the ray tube and wavefront segments are computed 108. The next ravel time grid point within the ray tube is selected and the traveltime and amplitude for that point are computed 109. A check is made to see if the traveltime for that grid point has already been computed by another ray. If not, the computed traveltime is assigned to this grid point 111 and a check is made to see if the maximum energy criterion has been selected 112. If so, the computed amplitudes are assigned to the current amplitude grid point 113 and the method proceeds to 124 in FIG. 7b. If the answer at 112 is negative, the method proceeds to 117 in FIG. 7b while if the answer at 110 is negative, the method proceeds to 116 in FIG. 7b.

Figure 7A:
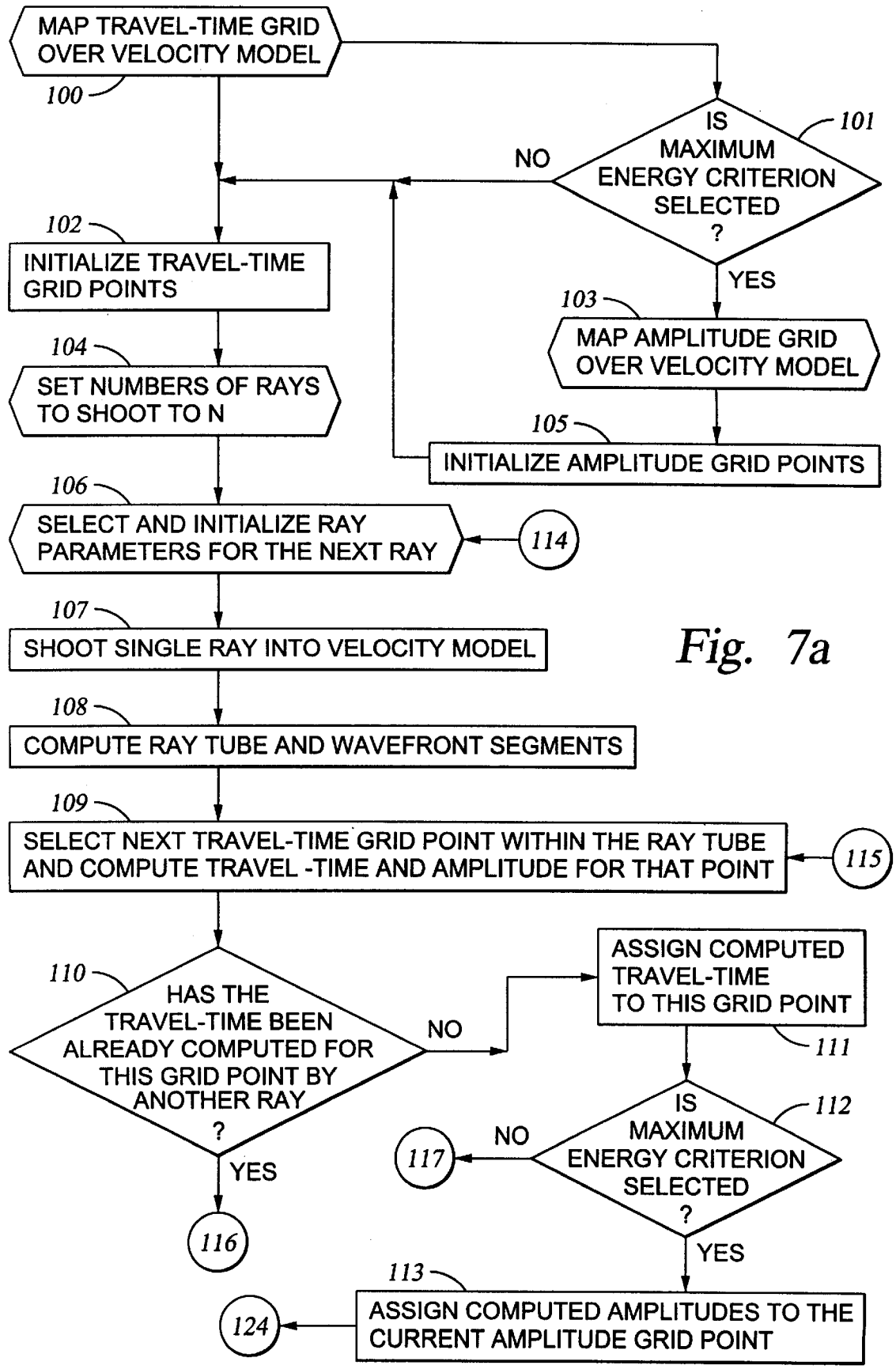
FIGS. 7a–7d show a flow chart of the principal steps of an embodiment of the invention.
Figure 7B:
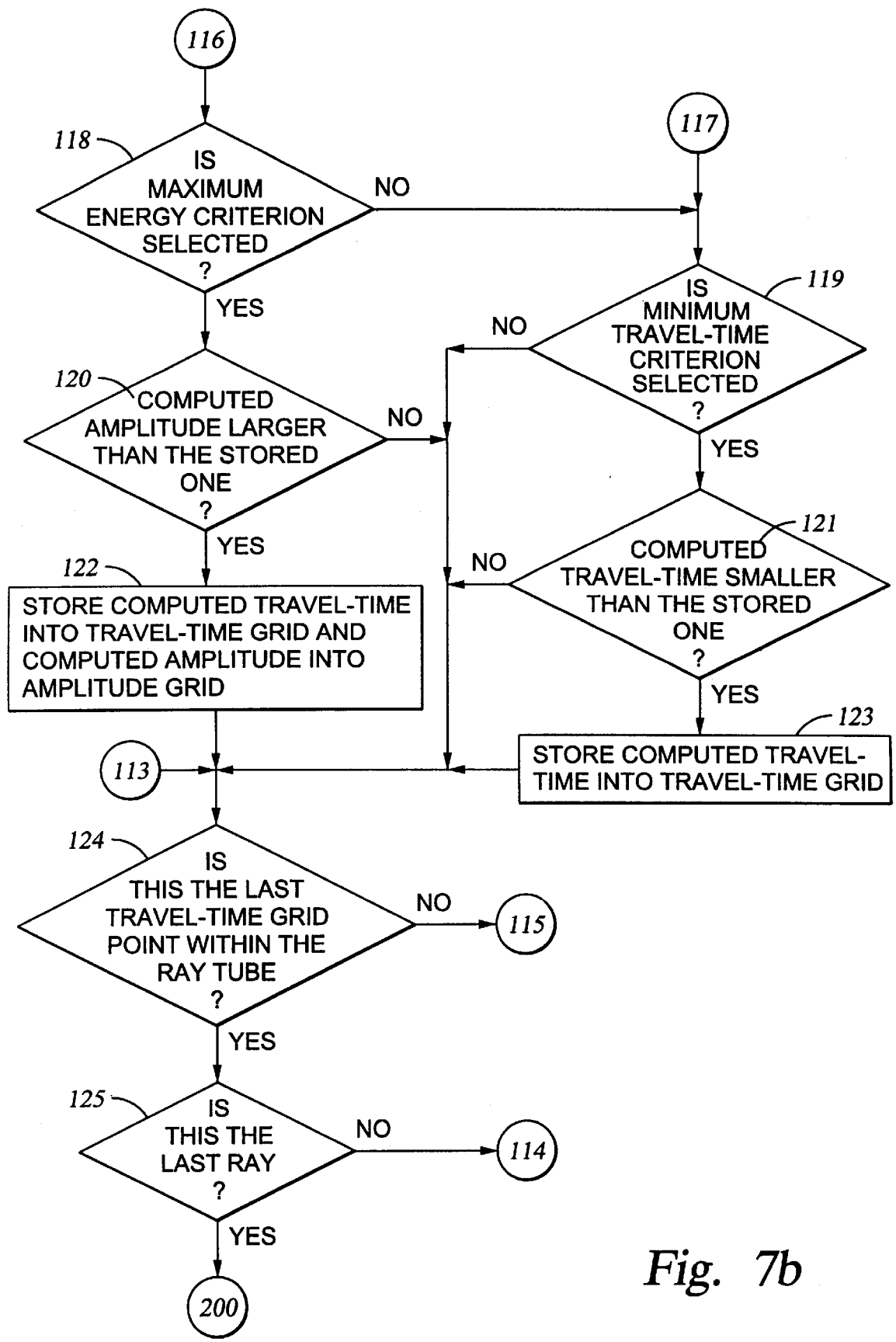

Proceeding now to FIG. 7b, at 118 a check is made to see if the maximum energy criterion has been selected. If so, a check is made to see of the computed amplitude is greater than the stored amplitude (box 118 is reached only when more than one traveltime has been computed for a grid point at 110)120. If the answer here is positive, the copmputed travel time is stored into the traveltime grid and the computed amplitude is stored into the amplitude grid 122. A check is made to see if this is the last traveltime grid point within the ray tube 124. If not, processing goes back to 109 and the next traveltime gridpoint within the ray tube is selected. If the check at 124 is positive, a check is made to see if this is the last ray 125. If not, processing goes back to 106 for the next ray. If the answer at 125 is positive, processing goes to FIG. 7c.

Still referring to FIGS. 7a and 7b, at 119 a check is made to see if the minimum traveltime criterion has been selected. If not, processing goes to 124 where, as before, checks are made to see if this is the last grid point within the ray tube 124 and the last ray 125. If, on the other hand, the test at 119 is positive, a check is made to see if the computed traveltime is less than the stored value for the grid point 121. If not, processing goes to 124 where, as before, checks are made to see if this is the last grid point within the ray tube 124 and the last ray 125. If, on the other hand, the test at 121 is positive, the computed traveltime is stored into the traveltime grid 123 prior to proceeding to 124.

Figure 7C:
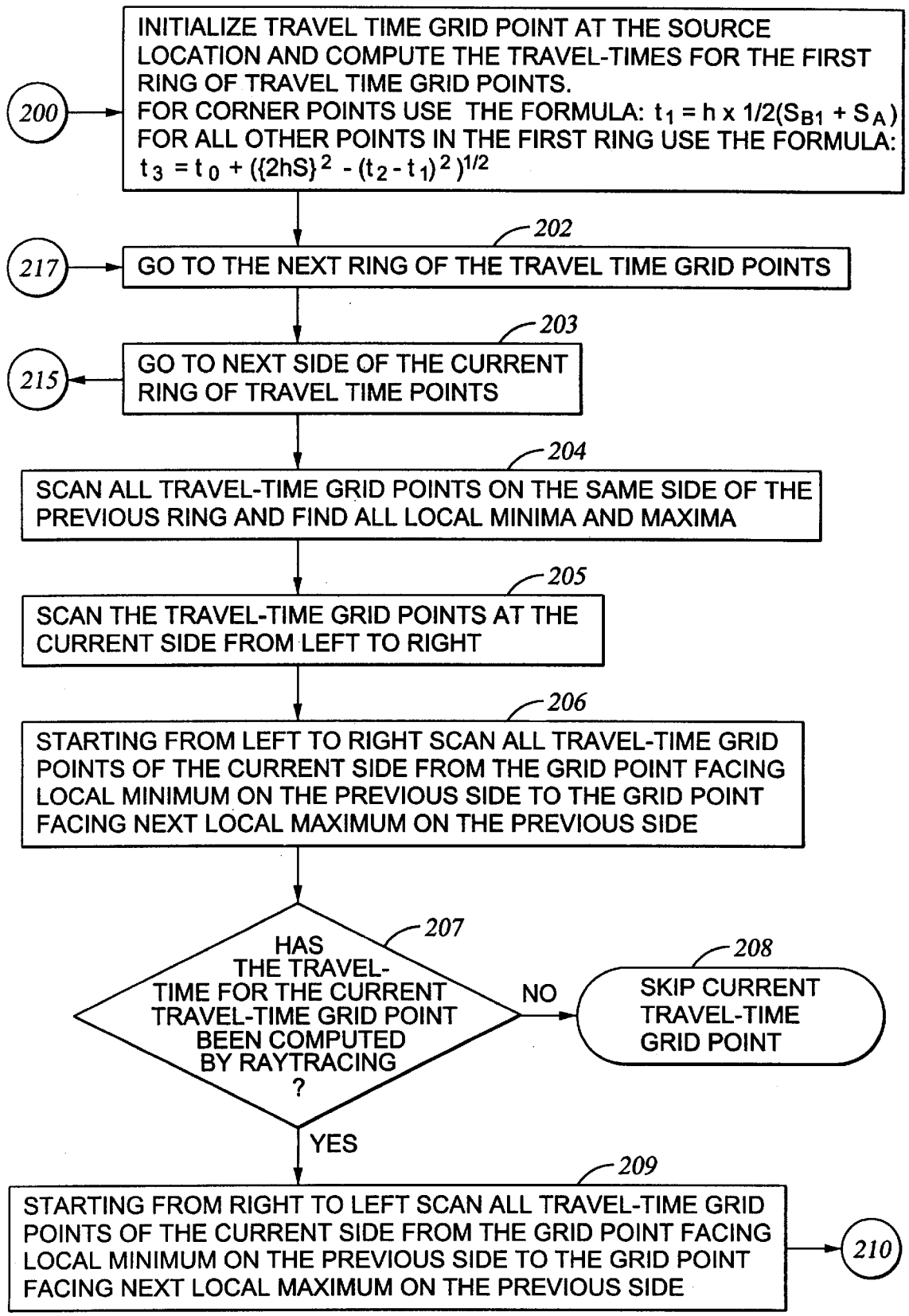
Figure 7D:
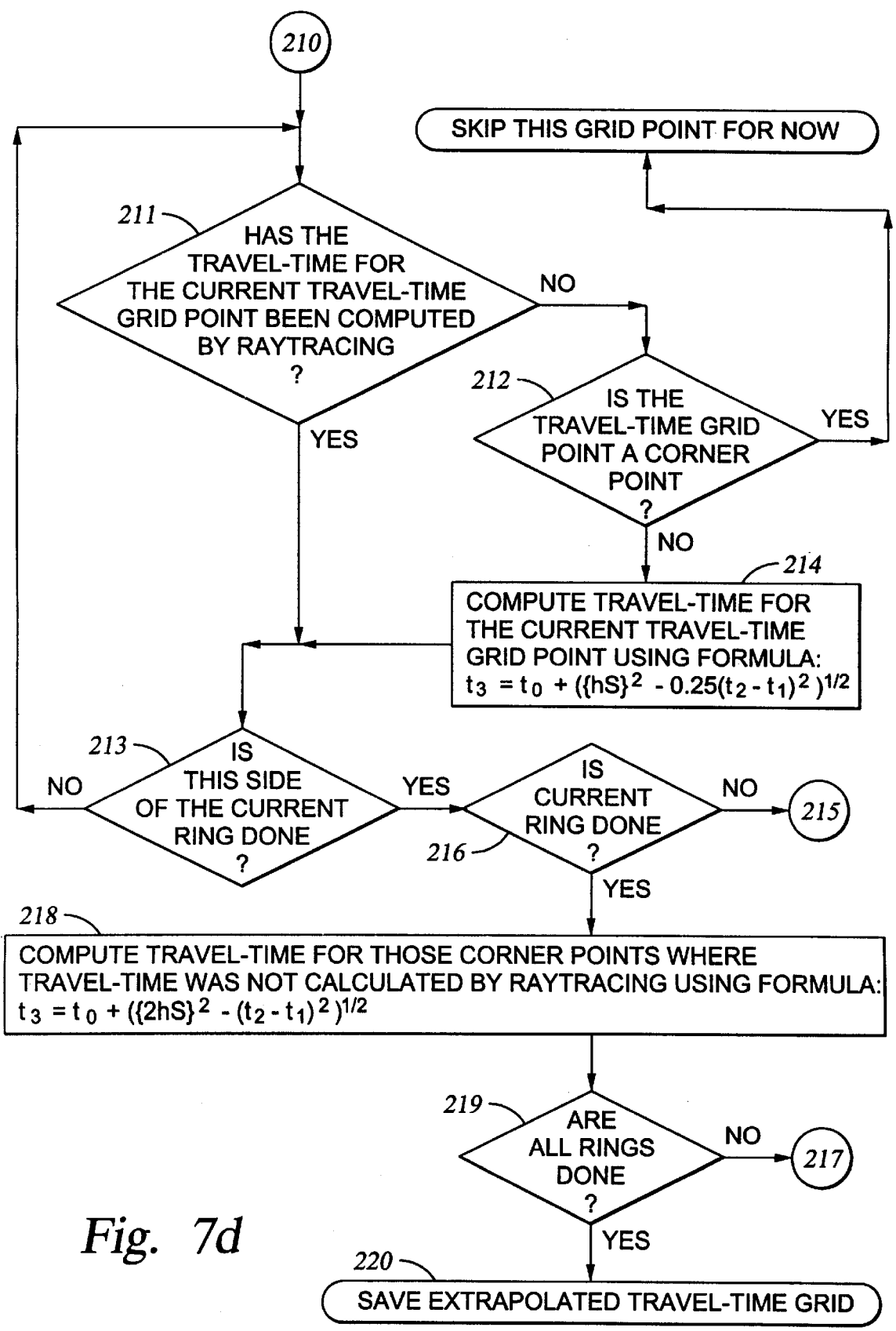

It can be seen that FIGS. 7a and 7b relate to the determination of those points on the traveltime grid that may be reached by ray tracing and using the selected criterion (maximum energy or minimum time, as the case may be) for selecting values where multiple raypaths reach the traveltime grid point. FIGS. 7c and 7d relate to the eikonal extrapolation of the determined traveltime and amplitude values in FIGS. 7a and 7b. There is an initialization of the traveltime gridpoint at the source 200. There is an outer iterative loop extending from 202 to 219 for successive rings of traveltime gridpoints and an inner iterative loop extending from 203 to 216 to cover both sides of the traveltime grid. The eikonal extrapolation is performed at 214 that is reached only if no traveltime has been computed at 211 and the point is not a corner point.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A computer-aided method for extrapolating reflection travel-time estimates into wavefront travel-time shadow zones caused by ray-path distortion associated with a complex geologic model of the earth, comprising:

(a) mapping a graticule of travel-time grid points over said model, each travel-time grid point for receiving a quantity representative of the arrival time of a wavefront segment thereat;

(b) initializing the contents of each said travel-time grid point with a unique preselected code;

(c) shooting a plurality of ray tubes into said complex geologic model by known ray-tracing methods from a preselected source point;

(d) for every travel-time grid point that is traversed by each said ray tube, replacing the preselected code previously resident in said travel-time grid point with a numerical estimate of the travel time of the wavefront arriving at that travel-time grid point from said source point;

(e) accepting as a valid wavefront travel-time estimate the one of the travel-time estimates that satisfies a preselected criterion when more than one travel time is assigned to any of said travel-time grid points in d), said preselected criterion being one of (i) minimum traveltime, and, (ii) maximum energy;

(f) re-evaluating the wavefront travel-time estimates at each said travel-time grid point relative to said preselected source point using a finite difference algorithm;

(g) scanning the data assigned to each said travel-time grid point, and (i) if a copy of said unique preselected code remains resident at a selected travel-time grid point upon initiation of step f), extrapolating the wavefront into the selected travel-time grid point by substituting the re-evaluated wavefront travel-time estimate from step f) for the unique preselected code resident in said selected travel-time grid point, (ii) else preserve the quantity accepted in step e).

2. The method as defined by claim 1, wherein:

the preselected criterion in step f) is the arrival time of the maximum energy content of the wavefront.

3. The method as defined by claim 1, wherein:

the preselected criterion in step f) is first-arrival time of the wavefront.

4. The method as defined by claim 1, wherein:

the presence of said unique preselected code at a selected travel-time grid point upon initiation of step f) characterizes said selected travel-time grid point as residing in a shadow zone.

5. A method for determination of traveltimes of seismic waves to a plurality of subsurface location points comprising:

(a) obtaining a velocity model over a region including said plurality of subsurface location points;

(b) performing raytracing through said velocity model to give a plurality of rays, said rays characterizing the paths of seismic waves in the subsurface;

(c) identifying a first subset of the plurality of subsurface location points proximate to said plurality of rays and estimating traveltimes to said first subset of subsurface location points by interpolating traveltimes from a portion of the plurality of rays proximate to each of said first subset of subsurface location points;

(d) for each of the first subset of the plurality of reflection points having more than one traveltime associated therewith from (c), selecting the traveltime having one of (i) minimum traveltime, and (ii) maximum energy;

(e) identifying a second subset of the plurality of subsurface location points not proximate to said plurality of rays and obtaining traveltimes to each of said second subset of subsurface location points by solving the eikonal equation and using estimated traveltimes to the first subset of subsurface location points.

6. The method of claim 5 wherein, if any of the first subset of subsurface points has more than one traveltime associated therewith, using a preselected criterion to select one of the more than one associated traveltime.

* * * * *